United States Patent

[11] 3,624,624

[72] Inventor Wesley R. Johnson
Minneapolis, Minn.
[21] Appl. No. 844,477
[22] Filed July 24, 1969
[45] Patented Nov. 30, 1971
[73] Assignee Sperry Rand Corporation
New York, N.Y.

[54] MAGNETIC DRUM AIR FILTRATION AND PURGING SYSTEM
11 Claims, 5 Drawing Figs.

[52] U.S. Cl. .................................................. 340/174.1 E,
55/385, 55/473, 179/100.2 P, 346/74 MD
[51] Int. Cl. .......................................................... G11b 5/76
[50] Field of Search ............................................ 179/100.2
C, 100.2 P; 340/174.1 E, 174.1 F; 346/74 MD;
55/385, 473

[56] References Cited

UNITED STATES PATENTS

| | | | |
|---|---|---|---|
| 2,950,353 | 8/1960 | Fomenko | 340/174.1 |
| 3,110,889 | 11/1963 | Moreley et al. | 340/174.1 |
| 3,248,737 | 4/1966 | Thomas, Jr. et al. | 340/174.1 |
| 3,319,236 | 5/1967 | Hajen | 340/174.1 |
| 3,373,414 | 3/1968 | Carter | 340/174.1 |
| 3,381,285 | 4/1968 | Wallen | 340/174.1 |
| 3,480,964 | 11/1969 | Siler | 340/174.1 |
| 3,303,485 | 2/1967 | Lee | 340/174.1 |
| 3,060,433 | 10/1962 | Lee, Jr. et al. | 179/100.2 |

*Primary Examiner*—Terrell W. Fears
*Assistant Examiner*—Vincent P. Canney
*Attorneys*—Thomas J. Nikolai, Kenneth T. Grace and John P. Dority

ABSTRACT: A filtration and purging system for use in a magnetic drum system, and utilizing the pumping effect of the rotating magnetic drum is described. A magnetic drum housing is provided with an input portion for receiving filtered air from the atmosphere, and a plurality of recirculation pickup tubes for circulating the internal housing air through a purging filter and returning the air to the drum housing is shown. The pumping action is performed by the rotating magnetic drum and the pressure inside the drum housing is maintained higher than the external ambient pressure. Additionally, apparatus is described for maintaining a positive pressure in the bearing region for forcing any aerosol through vents to the atmosphere rather than into the interior of the magnetic drum housing.

INVENTOR
WESLEY R. JOHNSON

BY Charles A. Johnson
ATTORNEY

MAGNETIC DRUM AIR FILTRATION AND PURGING SYSTEM

BACKGROUND OF THE INVENTION

1. Field of the Invention

This invention relates generally to magnetic drum systems; and, more specifically, relates to the field of improved filtration and purging systems for maintaining the internal housing air for magnetic drum memory systems clean and substantially contaminating-particle free.

2. Description of the Prior Art

It has been recognized in the prior art that clean air in the internal housing is required for proper operation of magnetic drum memory systems. This is especially true in the so-called flying head drums where the read/write heads are supported on a layer of air. Any dirt in the area of these heads can cause malfunction; and, if buildup results, can cause scoring of the drum surface. Prior art filtration systems have sometimes been part of the cooling system, and have included fans, or blowers, for forcing air into the magnetic drum housing, with an arrangement for exhausting the air at some other part of the housing. These fans or blowers, require power to drive, add to the noise level of the system, and are an additional manufacturing expense. It was common to exhaust the air back to the atmosphere after having passed through the drum housing. For such arrangements, there is a continual recycling of the air from the atmosphere, into the drum housing, and back to the atmosphere. This recirculation provided an increased burden on the filtering systems in order to assure that the drum housing is maintained substantially free of any contaminating particles. In an effort to alleviate this problem of recirculation of ambient atmospheric air, the prior art has developed specially built drum housings, wherein the air is passed through filters into the housing, and is not permitted to escape, except for leakage. Such systems do not take into account contaminants that are permitted to enter the housing during maintenance and as a result of input leakage.

Still another problem in the prior art exists in the arrangement wherein the air is permitted into the drum housing in the vicinity of the drum rotor supporting bearings. For such an arrangement, there is a relatively more high pressure on the outside of the bearings than on the internal portion thereof. It has been recognized, that such airflow tends to generate an aerosol of the bearing lubricant that leaves the bearings and enters the drum housing, thereby forming a contaminant to all internal parts of the magnetic drum system. Any aerosol in the housing acts as a binder for holding dirt particles on the drum or read/write heads, thereby tending to cause failures.

SUMMARY

In summary, then, this invention comprises an improved air filtration and purging system for a magnetic drum memory system and utilizes a plurality of input ports for receiving filtered air from the atmosphere into the drum housing. The air is drawn into the drum housing by the pumping effect of one end of the rotating magnetic drum. The invention includes a plurality of pickup tubes for carrying the air out through a purging filter, with the purged air being reinjected into the drum housing through a second plurality of apertures. The reinjection of the air into the drum housing is caused also by the pumping effect of the other end of the rotating magnetic drum. The invention also includes aerosol vents for venting the aerosol generated in the bearings to the atmosphere, and is accomplished by the relationship of the air pressures external to the drum system and internal to the drum housing being such that there is a relatively more high pressure on the insides of the bearings thereby forcing the aerosol out the aerosol vents rather than into the magnetic drum housing.

A primary objective of this invention, then, is to provide an improved magnetic drum filtration and purging system. Still another object of this invention is to provide a magnetic drum system that does not require air blowers or fans other than used for normal drum system cooling; and relies on the pumping action of the magnetic drum rotor for causing the internal housing air to recirculate. Yet another object of this invention is to provide an air filtration and purging system for magnetic drum memory systems wherein bearing aerosol is prevented from entering the magnetic drum housing. Still a further object of this invention, is to provide an improved drum housing pressure system including aerosol vents for venting the bearing aerosol to the atmosphere rather than into the magnetic drum housing. These and other more detailed and specific objectives will become apparent to those skilled in the art from a consideration of the specification when taken in light of the drawings.

DESCRIPTION OF THE PREFERRED EMBODIMENT

Figure 1:
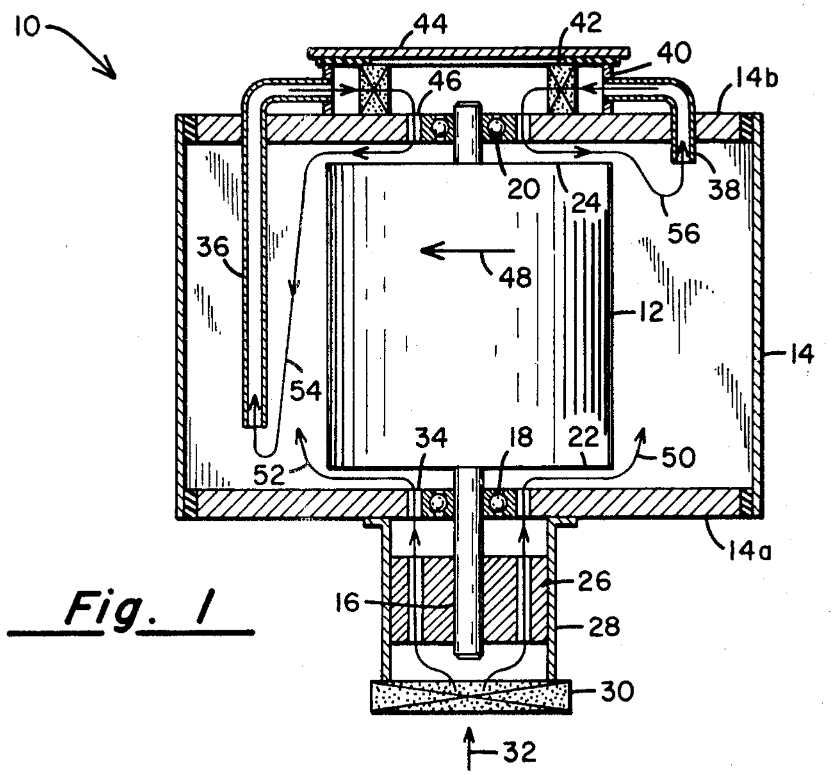
FIG. 1 is a sectioned diagrammatic view of the air filtration and purging system of this invention.

In FIG. 1, there is shown a sectional diagrammatic view of a magnetic drum memory system 10, including a magnetic drum rotor 12 enclosed within a drum housing 14. Reading and recording transducers (not shown) cooperate with the rotor. The drum housing 14 has a lower supporting member **14*a* and an upper member 14*b*. The drum rotor is rotatably mounted by shaft 16, and is supported on bearings 18 and 20 at the ends 22 and 24, respectively. A drive motor 26 is mounted in drive motor housing 28, and inlet filter 30 covers the end of housing 28 and filters the air that moves in the direction of arrow 32 prior to its injection into the drum housing 14. The, air passes through the drive motor 26, and through input apertures 34. In one embodiment, the recirculation portion of the filtration and purging system includes a plurality of long pickup tubes 36 and a plurality of short pickup tubes 38. Alternatively, these tubes can all be of uniform length, with reliance on internal air turbulence to prevent any dead spots. These tubes 36 and 38 extend into the drum housing 14, and carry the air into the housing 40 that encloses the purging filter 42. The housing 40 has an end plate 44. As the air passes through purging filter 42, it is reinjected through recirculation apertures 46** into the drum housing.

With the application of power to drive motor 28, the magnetically coated rotor 12 is caused to rotate, characteristically at a speed 7,150 revolutions per minute, in the direction of arrow 48. This rotation causes the air contacting the lower surface 22 of drum rotor 12 to be driven outwardly as indicated by arrows 50 and 52. The driving out of the air in this manner, results in a pressure buildup near the periphery of rotor 12, and creates a partial vacuum near the axis 16. Since the partial vacuum is caused in the vicinity of axis 16, more air is caused to be drawn in through the inlet filter 30 and through the input apertures 34.

With the magnetic drum rotor 12 having a characteristic diameter of 10.5 inches, and when rotating at approximately 7,150 revolutions per minute, an internal pressure within housing 14 of approximately 2.5 inches of water is developed. The pumping action of the drum causes a portion of the air to be forced upward through the long pickup tubes 36 and the short pickup tubes 38, and recirculated through the purging filter 42.

With the recirculation apertures 46 in fluid communication with the inner portion of housing 40, that is, the portion within purging filter 42, the rotation of the rotor 12 at end 24 operates in a manner similar to that described at end 22. As the rotor rotates, there is the decreased pressure in the vicinity of the axis, coupled with the increase of pressure near the periphery of the rotor 12. This tends to draw the filtered air back in through recirculation apertures 46, as indicated by recirculation arrows 54 and 56. It can be seen, therefore, that the pumping action of the rotating magnetic drum 12 operates to draw in the air, and to recirculate within the drum housing 14 without the requirement of any additional blowers or fans. For the configuration just described, the volume of air coolant drawn from the atmosphere is a function of the leakage rate, and typically, will be in the approximate range of 2 to 3 cubic feet per minute.

For this illustrated embodiment of the apparatus described in FIG. 1, there are three long pickup tubes 36 and three short pickup tubes 38, each of the pickup tubes being directed into the purging filter. Again, it should be recalled that all of the pickup tubes can be short, with reliance on internal air turbulence for causing recirculation of all of the air in housing 14.

The input apertures 34 are characteristically one-half inch in diameter and are positioned relatively near the center of rotation about axle 16, and are 18 in number for this embodiment. In this arrangement, the purging filter 42 is generally circular in shape and has a diameter larger than the diameter of spacing of the recirculation apertures 46. As at the input side, there are 18 recirculation apertures each of which has a diameter of approximately one-half inch.

For the recirculation in this embodiment, the air forced through the six pickup tubes 36 and 38, and passed through the purging filter 42 and reinsertion apertures 46, results in a recirculation of the internal housing air of approximately 10 to 15 times per minute.

Figure 2:
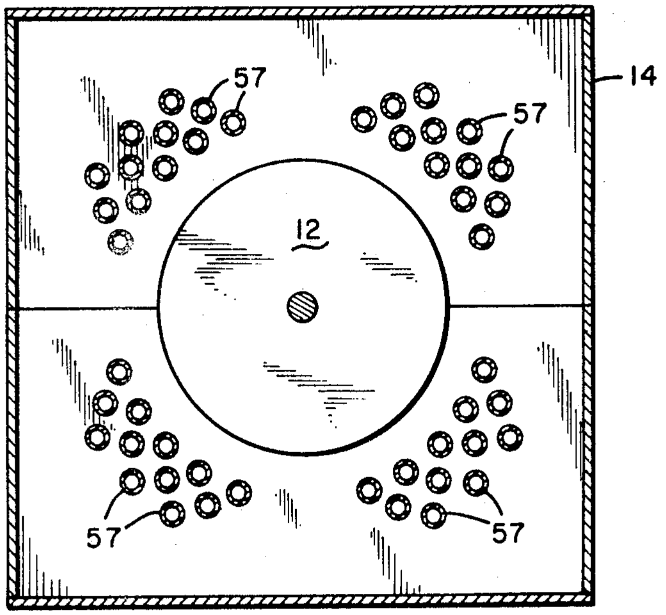
FIG. 2 is a top view of the external drum housing, illustrating the plurality of coolant fluid carrying tubes.

In FIG. 2 there is shown a view looking downwardly into the drum housing 14 with the top plate removed. In the discussion with regard to FIG. 1, there was no mention of the cooling of the drum system. The cooling air is maintained out of contact with any portion of the magnetic drum 12 or the read/write head (not shown) that are associated therewith. In order to accomplish this, a plurality of tubes 57 are utilized as heat exchanges. These tubes, of which there are 90 in number for this embodiment, have an diameter of three-fourths inch and are arranged to cooperate with a cooling plenum at the bottom of the drum housing 14. The cooling air is forced upwardly in the heat exchanger tubes 57 carrying heat from the drum system out through the top end plate. It can be seen in FIG. 2, that the housing 14 is made in two halves with gasket material being utilized between the two halves and at all other surfaces leading to the chamber where the drum rotor 12 is situated. This tends to minimize any inflow of contaminates while the housing 14 is closed and the drum is in operation. These arrangements will be discussed in more detail below.

Figure 3:
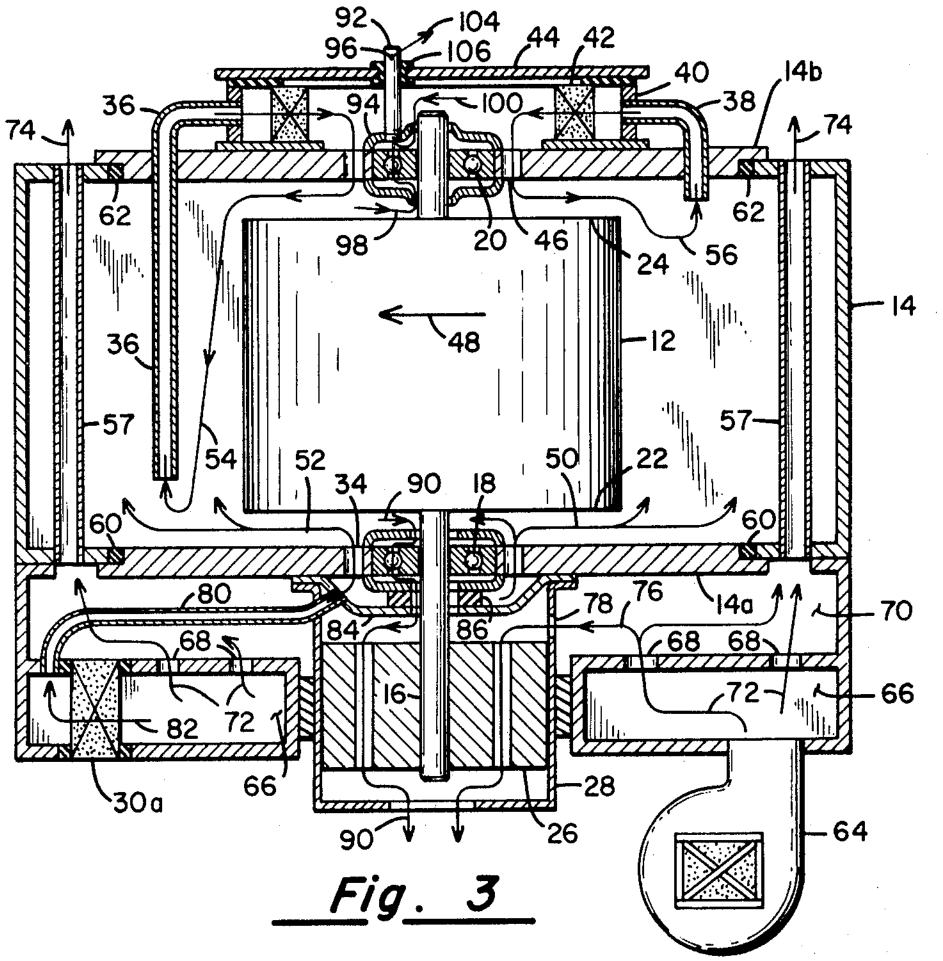
FIG. 3 is a sectional view of one form of direct-drive magnetic drum arrangements, and illustrates the aerosol vents for venting the bearings to the atmosphere.

FIG. 3 is a sectional diagrammatic view of the internal air filtration and purging system for use with a direct-drive drum, with the apparatus for venting the aerosol from the bearings added. Parts described above, will bear the same reference numeral as previously utilized. In order to accommodate the aerosol removal to the atmosphere, it is necessary that the arrangement be somewhat different from that of FIG. 1, in order to establish the proper air pressure relationships that will result in the outward flow of aerosol.

In this embodiment, the housing 14 has coolant-carrying tubes 57 mounted around the drum 12, in a manner similar to that illustrated in FIG. 2. For ease of illustration, only one such tube 57 is illustrated at each side. The housing 14 is sealed to the lower supporting member **14*a* by gasket 60 running completely around the circumference of the lower supporting member. In a similar manner, the upper supporting member 14*b* is engaged by gasket 62** for holding the air within the housing and not permitting inflow of any contaminates.

In this arrangement, the cooling system is utilized to generate the desired pressure relationships for venting the aerosol. The cooling system includes a blower 64 which provides filtered air into a circular plenum 66. This cooling plenum is arranged around the housing 28 that supports the drive motor 26. The pressure within plenum 66 is raised to approximately +1.5 inches of water, with respect to the ambient atmospheric pressure. Cooling plenum 66 has a plurality of apertures 68 in fluid communication with an auxiliary plenum 70. The apertures 68 characteristically can be holes having a diameter of approximately 1 inch. The air passes from blower 64 in the direction of arrows 72 through the apertures 68 into the auxiliary plenum 70. The pressure within auxiliary plenum 70 is approximately +0.3 inches of water. This air in the auxiliary plenum 70 is primarily used as coolant, and passes upwardly through cooling tubes 57 in the direction of arrows 74. A portion of this cooling air passes in the direction of arrow 76 through aperture 78 in the wall of housing 28 and outwardly through motor 26 for providing cooling to the motor.

In order to make use of the raised pressure in cooling plenum 66, a filter **30*a* is arranged in fluid communication with the plenum and fluid carrying tubing 80. The filter 30*a* is an inlet filter having a retention of approximately 99.97 percent of 0.3 micron particles. The air passing through filter 30*a* in the direction of arrow 82 provides a pressure in tubing 80. A circular cap 84 is arranged for surrounding axle 16, and is mounted to the lower support member 14*a*. The end of tubing 80 extends through the cap 84. A fluid seal 86 is arranged around the axle 16 and between the inner surface of cap 84 and the lower portion of the bearing support. There is approximately a 2 mil clearance of the cap 84 with regard to the outer surface of axle 16. This arrangement is such that the air inserted in tube 80 is forced inwardly into the inner portion of cap 84, and through the input apertures 34 to the inner drum housing, as indicated by arrows 50 and 52. The pressure in tube 80 is somewhat reduced from that in the cooling plenum 66 due to the restriction of filter 30*a*, but the final internal pressure in housing 14 results in approximately +3.0 inches of water at the outer periphery of the housing. It will be recalled from above, that the pressure in the vicinity of the axis of rotation is reduced. For this configuration, the pressure at the bearings 18 and 20 on the inside of housing 14 will be approximately +1.0 inch water. Referring to bearing 18, this positive pressure on the inside of housing 14 will result in air flow in the direction of arrow 90 through the 2 mil clearance around axle 16, through the bearing, inside the seal 86, and out through the 2 mil clearance around axle 16 of housing 84. This direction of airflow will result in aerosol being removed in the direction of arrow 90 and out through the motor 26 and the housing 28** to the atmosphere.

Next turning to a consideration of the upper end of the system, it will be seen that internal air is circulated through tubes 36 and 38 through filter 42. Filter 42 has a retention of approximately 99.97 percent of 0.3 micron particles. For the embodiment shown, the pressure within the internal area of filter 42 will be approximately +2.0 inches water. This is approximately the pressure of recirculation air through recirculation apertures 46. To handle the aerosol from bearing 20, a pipe 92 is arranged to be screwed into cap 94 and to extend through an aperture in plate 44 out to the atmosphere. The pipe is arranged with a pair of holes 96 outside of plate 44. These holes 96 are approximately 40 mils each in diameter.

It will be recalled from above, that it was stated that the pressure in the vicinity of the axles is approximately +1.0 inch water. Since the pressure in the upper chamber is at approximately +2.0 inches water, there will be airflow in the direction of arrows 98 through the 2 mil clearance around the axle and into bearing 20. There will also be airflow through the 2 mil clearance in cap 94, as indicated by arrows 100 within cap 94. These two airflows will result in an outward flow of air through hole 96 as indicated by arrow 104 and will carry the aerosol out of bearing 20.

Aerosol vent tube 92 is sealed through the opening in plate 44 by grommet 106.

From the foregoing discussion, it can be seen that by the arrangement of the components, that the pressure within drum housing 14 is maintained sufficiently higher than a ambient atmospheric pressure, thereby causing the exhaust of internal air through the bearings to be outwardly through the aerosol vents rather than inwardly to the interior portion of the drum housing. By maintaining this higher internal pressure, any contaminates that may be injected into the housing during maintanence, or due to leaks in the seals, are readily purged by passing through filter 42 and that contaminating aerosol that would otherwise form a binder for making particles adhere to internal surfaces, is eliminated from the magnetic drum system by passing it outwardly rather than being introduced into the area of the magnetic rotor and its associated read/write circuits. It is recognized that it is necessary to have relatively small openings for exhaust through the bearings, as indicated by the 2 mil clearance for passage of air through the bearings, since an excess of airflow through the bearings 18 and 20 will tend to dry out the lubricant, thereby ultimately causing mechanical failure. This balance is maintained such that there is a minimal airflow through the bearings, but with the pressure being such that any aerosol that is generated is exhausted rather than being taken into the drum housing.

Figure 4:
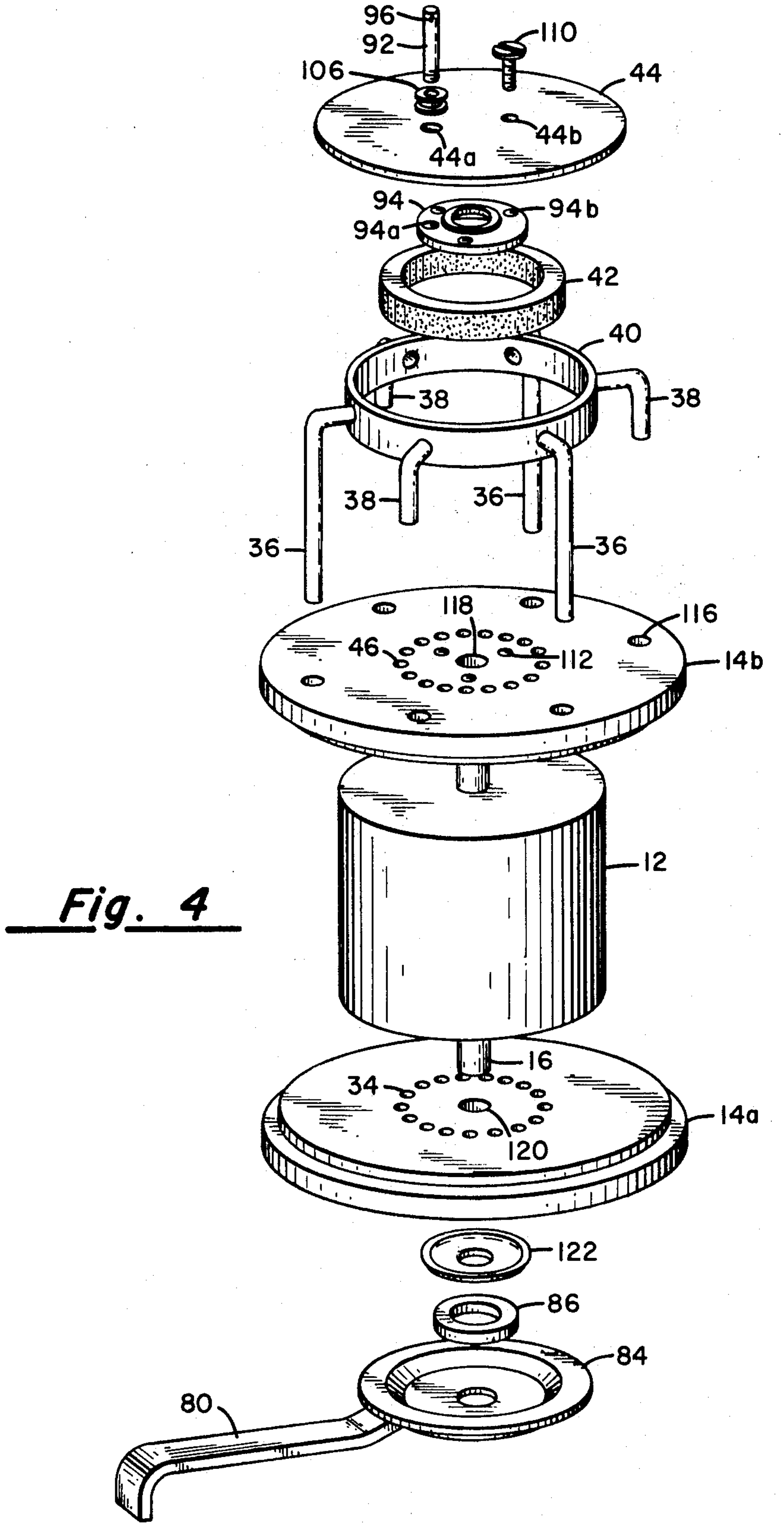
FIG. 4 is an exploded view of the filtration and purging portion of system of FIG. 3.

Having discussed the pressure relationships, together with the arrangement of the hardware, attention is directed to FIG. 4 where there is shown an exploded view of the major portions of the purging system. It should be understood, that the lower support member 14*a* and upper support member 14*b* will have other apertures therethrough for mounting head structures and the like, but that they are not illustrated in this explanation for ease of understanding the relationship of the elements that are necessary for the purging system. In FIG. 4, it can be seen that the upper plate 44 has aperture 44*a* for receiving the aerosol tube 92 and grommet 106. The plate also has aperture 44*b* for receiving holding bolt 110. The cap 94 is arranged to be attached by screws in the three apertures 112 in upper support member 14*b*. Cap 94 has threaded aperture 94*a* for receiving the threaded end of aerosol vent 92, and threaded hole 94*b* for receiving the end of the retaining screw 110. The filter 42 fits within housing 40 with the tubes 36 and 38 extending downwardly through apertures 116 in upper support member 14*b*. The recirculation apertures 46 are shown surrounding axle opening 118 and in close proximity thereto. The drum rotor 12 fits between the upper support member 14*b* and the lower support member 14*a*, with the input apertures 34*b* and seen in lower support member 14*a*. Axle 16 is arranged for extending downwardly through opening 120 in lower support member 14*a*, and will extend down through cap 122, seal 86, and out through covering 84 for being coupled to the drive motor.

Figure 5:
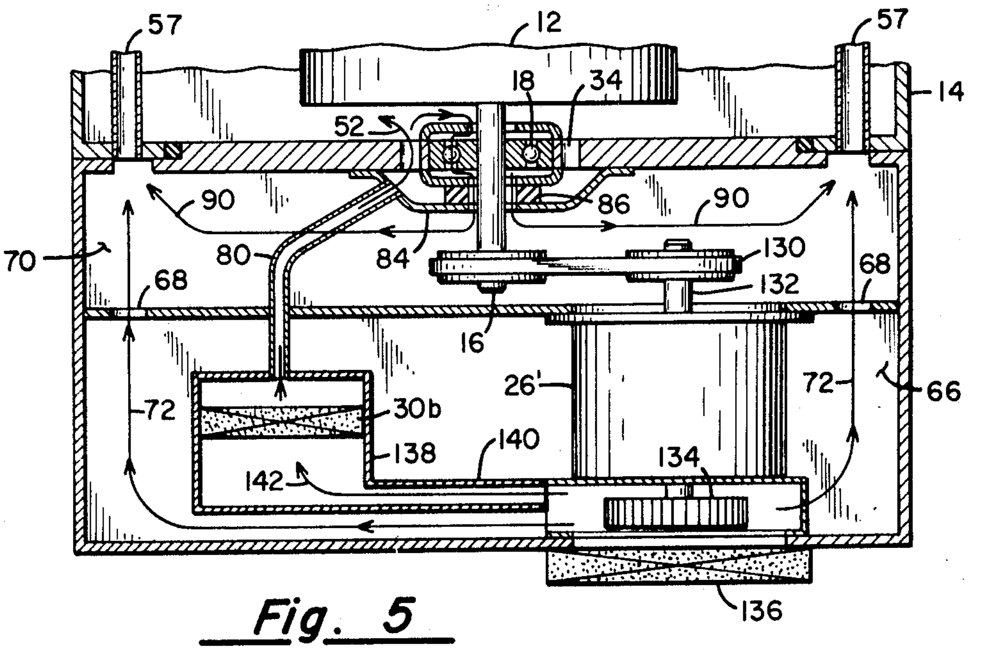
FIG. 5 is a sectional diagrammatic view of a belt-driven magnetic drum system and illustrates an alternative arrangement for venting the aerosol from the support bearing to the atmosphere.

In FIG. 5, there is illustrated a partially sectioned diagrammatic view of an alternative embodiment of this invention, wherein the drive motor 26' is mounted separately from drive shaft 16 with a belt drive 130 coupling the output shaft 132 of drive motor 26' to the drive shaft 16 of the rotor 12. The drive motor 26' is mounted in cooling plenum 66 and is arranged with a blower 134 mounted for drawing air in through filter 136, and directing it in the direction of arrows 72 through aperture 68 into auxiliary plenum 70. This operation is similar to that described above, except that in this instance the blower 134 is driven by the drive motor 26' rather than being a separate blower. In this arrangement, the pressure within cooling plenum 66 is only approximately +0.5 inch water, with the pressure in the auxiliary plenum 70 being approximately +0.3 inch water, In order to derive the appropriate pressure for maintaining the internal portion of the housing 14 at levels high enough to exhaust the aerosol outwardly, it is necessary to have more than the +1.5 inch water pressure of the cooling plenum. To accomplish this higher pressure, a pressure chamber 138 is arranged with an input tube 140 in close proximity to the output of blower 134. With this arrangement, the pressure within chamber 138 can be raised to the +1.5 inches water necessary for the appropriate pressure balance. The pressure can be varied by adjusting the relationship of input tube 140 with relation to the degree of direct flow from blower 134. As air is directed into chamber 138 in the direction of arrow 142 it passes through filter 30*b*, with this filter having a retention of 99.97 percent of 0.3 micron particles. The tubing 80 is coupled to the output portion of housing 138 and directs airflow into cover 84. With this arrangement, the pressure inside housing 14 in the vicinity of bearing 18 is again +1.0 inch water and the same mode of operation for purging the internal air and exhausting the aerosol of that described in FIG. 3 results. In this configuration, the aerosol is exhausted into auxiliary plenum 70 and passes, for instance, in the direction of arrows 90 to be exhausted through the cooling tubes 57 out the top of the drum housing 40. In this regard, it may be seen that the operation differs only slightly from that of the system described in FIG. 3 in that the aerosol from bearing 18 is discharged into a chamber at a pressure +0.3 inch water rather than into ambient atmospheric pressure, but the pressure differential from +1.0 inch water to atmosphere or +1.0 inch water to +0.3 inch water is sufficient to assure that the aerosol will be discharged outwardly. The upper portion of the system is identical to that shown in FIG. 3.

From the foregoing, is clear that the various stated objectives and purposes of the invention have been achieved by the apparatus described in detail herein. Recognizing the various changes in equipment arrangement, dimensions, pressures, and the like, will become readily apparent to those skilled in the art without departing from the spirit and scope of the invention, what is intended to be protected by Letters Patent is set forth in the appended claims.

1. For use in apparatus having a rotatable rotor having first and second ends, decontaminating system comprising: housing means having first and second end means and enclosure means arranged for substantially enclosing the rotor, said first end means including a plurality of fluid input apertures for receiving fluid therethrough, said fluid being pumped by the interaction of the surface of the rotating rotor with the surrounding fluid; purging means mounted in fluid communication with said housing means for removing contaminates from the fluid within said housing means by recirculating a portion of said fluid from within housing and through said purging means; and a plurality of fluid recirculation apertures in said second end means through which apertures the decontaminated fluid is recirculated back into said housing means by the pumping action produced by the interaction of the rotation of the rotatable rotor with the surrounding fluid.

2. A decontaminating system as in claim 1 wherein said plurality of input apertures is arranged around and substantially close to the axis of rotation of the rotatable rotor, the rotation of the rotor causing fluid to be moved outwardly at the first end of the rotor toward the periphery of the rotor, thereby causing a reduced fluid pressure in the vicinity of said input apertures for drawing fluid into said housing means, and for providing an elevated fluid pressure within said housing means.

3. A decontaminating system as in claim 2 wherein said plurality of fluid recirculation apertures in said second end means is arranged around and substantially close to the axis of rotation of the rotatable rotor, the rotation of the rotor causing the recirculating fluid to be moved outwardly at the second end of the rotor toward the periphery thereof, thereby causing a reduced fluid pressure in the vicinity of said recirculation apertures for recirculating said fluid through said purging means.

4. A decontaminating system as in claim 3 wherein said purging means includes a first group of relatively long pickup tube means arranged around the rotatable rotor inside said housing means, each of said first group of pickup tube means having a input end and extending along a substantial length of housing means from said second end means towards said first end means, and an output end extending through said second end means; a second group of relatively short pickup tube means arranged around the rotatable rotor inside said housing means, each of said second group of pickup tube means having an input end and extending along a relatively short length of said housing means, and an output end extending through said second end means; filter means in the vicinity of said output ends and in fluid communication therewith for removing contaminates from the air passing therethrough.

5. A decontaminating system as in claim 4 and further including aerosol venting means responsive to differential fluid pressures created by said rotating rotor for carrying aerosol out of said housing means for preventing contamination within said housing means.

6. A decontaminating system as in claim 5 and further including plenum means for supplying fluid under pressure; auxiliary blower means for creating a first fluid pressure in said plenum means; conduit means coupled to said plenum means for carrying a portion of said fluid under pressure to said input apertures, said auxiliary blower means and the pumping of the rotor combining to raise said reduced fluid pressure within said housing means in the vicinity of said apertures above said ambient fluid pressure for carrying said aerosol into said aerosol venting means and out of said housing means.

7. A decontaminating system as in claim 6 wherein said aerosol venting means includes pipe means for picking up said aerosol in the vicinity of rotor bearing means at one of said end means of said housing means for exhausting said aerosol to the ambient atmosphere.

8. A decontaminating system as in claim 6 wherein said aerosol venting means includes pipe means for picking up said aerosol in the vicinity of the rotor bearings at said second end means of said housing means for exhausting said aerosol therefrom to the ambient atmosphere, and bearing opening means for picking up said aerosol in the vicinity of the rotor bearings at said first end means of said housing means for exhausting said aerosol therefrom to said ambient atmosphere.

9. For use in a drum storage system the combination including: cylindrical rotatable rotor means having first and second end-plate means for closing the ends thereof, and axle means for mounting said rotor means; housing means having first and second end means and enclosure means, and arranged for substantially enclosing said rotor means, said first end means including a plurality of fluid input apertures, and said second end means including a plurality of fluid recirculation apertures; bearing means mounted in said first and second end means for cooperating with said axle means for mounting said rotor means; power means coupled to said axle means for rotating said rotor means; fluid input means coupled to said housing means for bringing fluid into said housing means, said fluid being pumped into said housing means from an ambient atmosphere in response to rotation of said rotor means, said pumping causing a higher fluid pressure in said housing means than said ambient atmosphere fluid pressure; and fluid purging means for removing contaminates from said fluid, said purging means in fluid communication with said housing means and said plurality of recirculation apertures, said fluid being pumped through said purging means from said housing means and back into said housing means through said plurality of recirculation apertures in response to rotation of said rotor means.

10. The combination as in claim 9 wherein said plurality of input apertures is arranged around and substantially close to said axle means, the rotation of said rotor means causing fluid to be moved outwardly at said first end-plate means toward the periphery of said rotor means, thereby causing a reduced fluid pressure in the vicinity of said plurality of input apertures for drawing additional coolant fluid into said housing means, and wherein said plurality of fluid recirculation apertures in said second end means is arranged around and substantially close to said axle means, the rotation of said rotor means causing fluid to be moved outwardly at said second end-plate means toward the periphery of said rotor means, thereby causing a reduced fluid pressure in the vicinity of said plurality of recirculation apertures for recirculating said fluid through said fluid purging means.

11. The combination of claim 10 wherein said fluid pressure means includes blower means for raising the air pressure at said input apertures above the pressure of said ambient atmosphere.

* * * * *